US010586384B2

(12) United States Patent
Kunen et al.

(10) Patent No.: US 10,586,384 B2
(45) Date of Patent: Mar. 10, 2020

(54) MAINTAINING 3D LABELS AS STABLE OBJECTS IN 3D WORLD

(71) Applicant: Microsoft Technology Licensing, LLC, Redmond, WA (US)

(72) Inventors: Isaac Kenneth Kunen, Seattle, WA (US); Brenton Gunning, Seattle, WA (US); Daniel Dole, Seattle, WA (US); Juan Pablo Candelas Gonzalez, Woodinville, WA (US); Donald A. Barnett, Monroe, WA (US); Romualdo Impas, Seattle, WA (US); David Buerer, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/412,253

(22) Filed: May 14, 2019

(65) Prior Publication Data

US 2019/0266791 A1    Aug. 29, 2019

Related U.S. Application Data

(63) Continuation of application No. 15/255,842, filed on Sep. 2, 2016, now Pat. No. 10,339,705, which is a
(Continued)

(51) Int. Cl.
*G06T 17/00* (2006.01)
*G06T 15/20* (2011.01)
(Continued)

(52) U.S. Cl.
CPC .......... *G06T 17/00* (2013.01); *G06K 9/00476* (2013.01); *G06T 7/285* (2017.01);
(Continued)

(58) Field of Classification Search
CPC .......... G06T 17/00; G06T 7/285; G06T 7/70; G06T 19/20; G06T 15/20; G06T 2200/04;
(Continued)

(56) References Cited

U.S. PATENT DOCUMENTS 8,988,426 B2  3/2015  Chen et al.
9,171,527 B2  10/2015  Siegel
(Continued)

FOREIGN PATENT DOCUMENTS

EP    2234067 A1    9/2010

OTHER PUBLICATIONS

"Apple 3D Maps Application on iOS 6 Source", Retrieved from: https://www.youtube.com/watch?v=vfmlSgCOxAg, Jun. 11, 2012, 4 Pages.
(Continued)

*Primary Examiner* — Robert J Craddock
(74) *Attorney, Agent, or Firm* — Drinker Biddle & Reath LLP

(57) ABSTRACT

Architecture that enables the preservation of label readability in a scene (e.g., map, map tiles, graphical background, etc.) by way of label orientation relative to a fixed heading on a plane or curved surface. After identifying an initial fixed heading, movement of the camera (e.g., zoom-in, zoom-out, position change, etc.) in the scene along that heading without changing the camera heading as measured relative to a fixed point does not alter label orientation. In a mapping implementation, after identifying an initial fixed camera heading over terrain of the Earth, movement of the camera (e.g., zoom-in, zoom-out, position change, etc.) in the scene without changing the camera heading as measured relative to some fixed point does not change label orienta-
(Continued)

tion. The orientation of labels may be changed if the heading of the camera is altered, but this change is delayed until camera movement quiesces.

20 Claims, 11 Drawing Sheets

Related U.S. Application Data continuation of application No. 14/210,343, filed on Mar. 13, 2014, now Pat. No. 9,530,239.

(60) Provisional application No. 61/904,440, filed on Nov. 14, 2013.

(51) Int. Cl.
*G06K 9/00* (2006.01)
*G06T 19/20* (2011.01)
*G06T 7/70* (2017.01)
*G06T 7/285* (2017.01)

(52) U.S. Cl.
CPC ............... *G06T 7/70* (2017.01); *G06T 15/20* (2013.01); *G06T 19/20* (2013.01); *G06T 2200/04* (2013.01); *G06T 2219/004* (2013.01); *G06T 2219/2004* (2013.01)

(58) Field of Classification Search
CPC ...... G06T 2219/2004; G06T 2219/004; G06K 9/00476
See application file for complete search history.

(56) References Cited

U.S. PATENT DOCUMENTS

| | | | |
|---|---|---|---|
| 9,396,697 B2 | 7/2016 | Adlers et al. | |
| 2013/0322702 A1* | 12/2013 | Piemonte | G06T 15/005 382/113 |
| 2013/0325343 A1* | 12/2013 | Blumenberg | G01C 21/00 701/533 |

OTHER PUBLICATIONS

"Google Maps Application on Nexus S", Retrieved from: https://www.youtube.com/watch?v=eXZT_YKh-20, Dec. 7, 2010, 6 Pages.

\* cited by examiner

MAINTAINING 3D LABELS AS STABLE OBJECTS IN 3D WORLD

CROSS-REFERENCE TO RELATED APPLICATIONS

The application claims the benefit of pending U.S. patent application Ser. No. 15/255,842, entitled "MAINTAINING 3D LABELS AS STABLE OBJECTS IN 3D WORLD", and filed Sep. 2, 2016, now U.S. Pat. No. 10,339,705, which is a continuation of U.S. patent application Ser. No. 14/210,343 entitled "MAINTAINING 3D LABELS AS STABLE OBJECTS IN 3D WORLD", filed on Mar. 13, 2014, now U.S. Pat. No. 9,530,239, which claims priority to Provisional Patent Application Ser. No. 61/904,440, entitled "MAINTAINING 3D LABELS AS STABLE OBJECTS IN 3D WORLD", and filed Nov. 14, 2013, the entirety of each of which is herein incorporated by reference.

BACKGROUND

Preserving label and text readability and minimizing motion relative to the underlying terrain when the user interactions with a 3D scene are continuing problems. Drawing text into a three dimensional (3D) scene where the viewpoint of the scene can change has typically been solved by either just placing the text on the screen as though it was in two dimensions (2D), but tacked to the 3D scene, or by placing the text as an object in 3D space that moves with the rest of the objects. The 2D approach leads to disconcerting movement of the text as the 3D view changes, and the 3D approach leads to the text being unreadable when the view is at certain angles.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the preservation of label (e.g., text, line, graphics, etc.) readability and a sense of orientation for the user in a scene (e.g., map, map tiles, graphical background, etc.) by way of label orientation relative to a fixed camera heading along a curve defined on a plane or curved surface, and re-orientation/re-positioning based on changes in the view. When applied to map navigations on spherical surfaces (e.g., the Earth), and with navigation following curved paths, the architecture enables selection of a fixed heading based on the direction in which the camera is pointing, and then laying out all labels so that each label's readability orientation (e.g., "up") is pointed along this heading. In other words, movement of the camera is not constrained to maintaining the same heading—the camera can pivot around a point, thereby constantly changing the camera heading. However, the heading used for orienting the labels remains fixed along a heading until the camera idles (camera movement ceases, if only momentarily).

In a mapping implementation, after identifying an initial fixed camera heading along a curve over terrain of the Earth, movement of the camera (e.g., zoom-in, zoom-out, position change, etc.) in the scene is along that curve without changing the camera heading as measured relative to a fixed point (e.g., true North, magnetic North, etc.).

The architecture comprises an algorithm that computes decision as to when to animate the label or labels between a laying down state and a standing up state based on camera position (the angle between the label-to-camera vector and the label normal (terrain)). The architecture minimizes the label motion relative to the scene by delaying the animation until the camera idles (motionless), by adding hysteresis to the animation process.

Labels are oriented to a fixed heading for a scene—the camera heading from which the camera perspective is provided to the user as the view. The readable surface of the label (the front face) is rendered to face or substantially face the camera so the user can read the label as presented in the view (equivalent to reading text or characters on a document where the document is usually placed in front of the viewing sensor). However, the spin of the labels may differ. Thus, as the camera elevation changes with a downward heading facing angle to the terrain, the "tilt" of the label(s) will also change (face more upward) to match the change in angle of the camera heading. The camera elevation, and hence, heading, can continue to increase until the camera will typically be looking straight (or substantially straight) down to a spot on the terrain. For example, where the camera elevation is close to zero (on the terrain), the labels are oriented such that the readable face is facing directly at the camera and with little, if any, tilt. As the camera is elevated, the labels tilt back to match the downward pointing angle of the camera More specifically, the "up" orientation of a label is aligned based on the heading and orientation (e.g., angle along the heading) of the camera. Additionally, the architecture minimizes label motion relative to the underlying scene (e.g., map terrain) when the user interacts with the scene (e.g., a map, globe, etc.), labels, etc.

The architecture uses a fixed heading to maintain the orientation of a set of labels in the scene. The heading can be picked in many different ways; however, in one implementation, the heading is selected to match the camera heading. All labels are then configured to be presented such that their associated "upright" orientation matches this selected heading. Thus, any navigation that maintains the chosen heading (e.g., the camera heading) will not affect the orientation of the labels. For example, a panning navigation that follows loxodromes—lines of constant heading—and therefore does not change the heading, and does not cause label re-orientations.

The architecture orients the labels at the current label locations (wherever the labels may be in the scene) relative to the heading defined by the camera heading. For example, English-speaking users may typically desire English text labels to be presented in an upright manner such that the letters are aligned horizontally and that read in a left-to-right fashion. This orientation mimics the way in which English text would normally be written.

It is also within contemplation of the disclosed architecture that for users utilizing other languages that may normally be written and read in different orientations (e.g., written/read right-to-left, top-down, top-down and right-to-left, etc.), the disclosed architecture can also accommodate and preserve these orientations along the chosen heading. For example, an East Asian user can be presented with labels as aligned along the chosen heading in a vertical fashion or a horizontal fashion, based on the particular East Asian user since writing may be in a top-down fashion and reading a right-to-left direction; however, this is no longer a true in all instances.

In all cases, the camera view (heading) showing text labels centered in the view will have the text labels aligned on the chosen heading that will be perceived as substantially aligned horizontal or vertical based on the language (for text), graphic, etc. Text labels that are presented farther away from the view center may be oriented slightly differently since the chosen heading may be a curved heading relative to the scene; thus, text labels, for example, near the bottom of the view may appear to be slanted downward (or inward) to the user in a left-to-right fashion, and text labels to near the top of the view will appear to be slanted downward (inward) to the user in a right-to-left fashion. However, as the user traverses upward along the chosen heading, the label orientation is "corrected" in the view center to a more horizontal orientation for English text, for example.

While panning a map, for example, the user's camera heading is not changed. Since camera heading is not changed during zooms or tilts, the movement that changes heading is an explicit change in heading such as turning the camera.

The readability is maintained in the entire scene but oriented optimally at or near the view center. Additionally, during most navigation (everything but an explicit heading change) the labels do not need to reorient, greatly reducing motion experienced by the viewer. A "non-centered" label will not necessarily be "up" in screen space, but will nonetheless have the same heading as a label in the center. Additionally, when the scene (e.g., map) is panned to center the label, the label is oriented "up" in screen space without having moved the label relative to ground, for example.

The disclosed architecture further provides the capability of animating labels as desired, by joining multi-dimensional (e.g., 3D and 2D) approaches of drawing labels such as text. This is accomplished by displaying the label (text) as a 3D object in the 3D scene when the view is stationary and first moving; thereafter, animating the text to a more optimal location and orientation (e.g., periodically) or when the view has stopped moving. This obtains the benefit of the label feeling stationary fir a duration of time, while also ensuring the label is perceivable (e.g., readable for the case of text). In one case, animation can be applied to text on the surface of a 3D map, and the view movement is caused by user interaction with the map. Additionally, a label can be "flipped" (incrementally rotated, in contrast to smoothly and continuously rotated) to be readable as the camera is still in motion when rotating a scene in the Y axis. Still further, labels (e.g., country, state, city, points of interest, people tags, etc.) can be flipped when the user has turned the 3D globe model, such as upside down (approximately one-hundred eighty degrees), for example.

Using a 3D scene and labels (e.g., text) to be displayed in the scene, the labels are placed in the 3D scene in an orientation that is readable. As the viewer moves around the 3D scene, the label is moved as any other 3D object in the scene. Once the view has settled (stopped moving) for some period of time, a new position is calculated for the label and the label is animated from its old position/orientation to its new position/orientation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
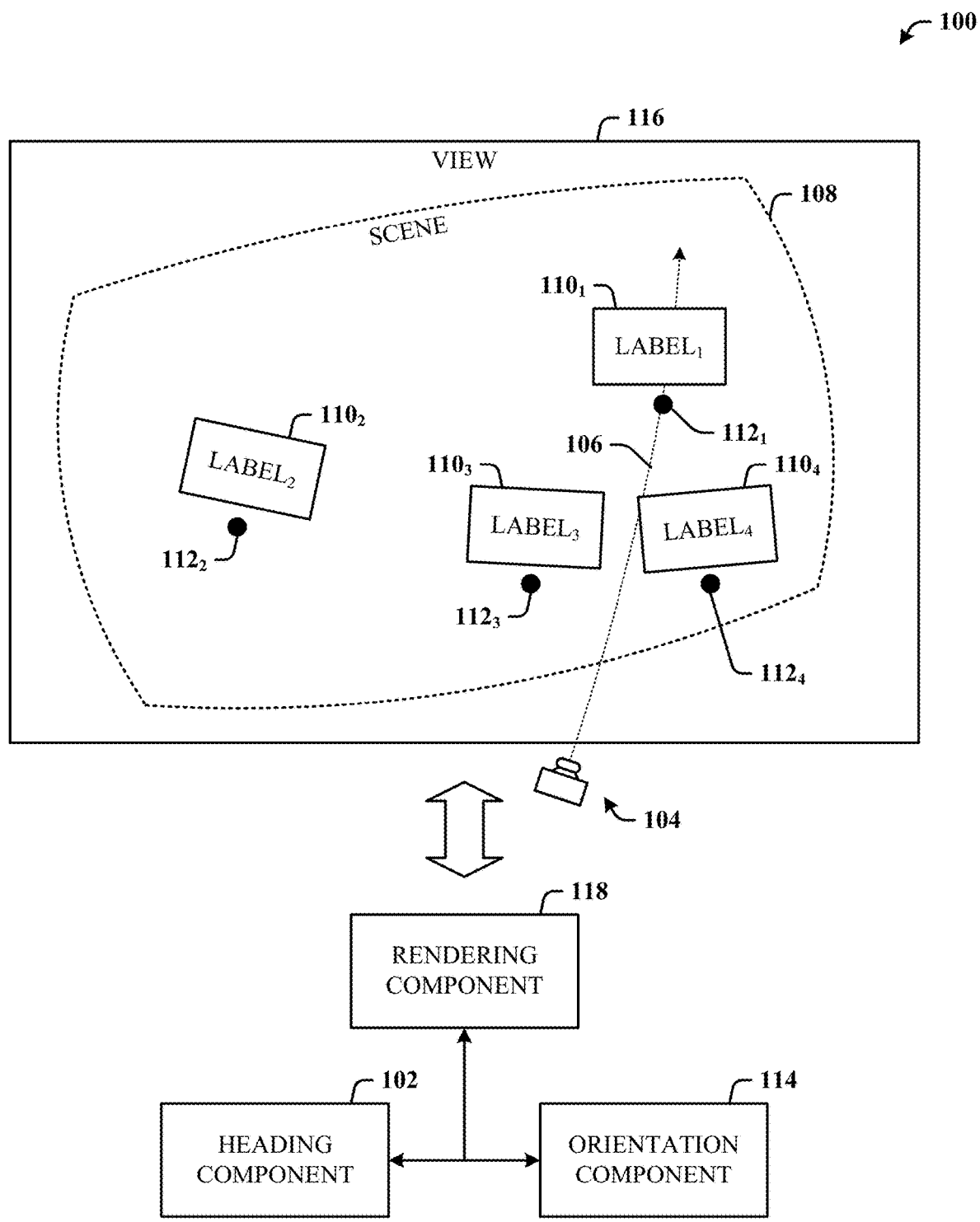
FIG. 1 illustrates a system in accordance with the disclosed architecture.

The disclosed architecture enables the preservation of label (e.g., text, line, graphics, etc.) readability in a scene (e.g., map, map tiles, graphical background, etc.) by way of label orientation relative to a fixed camera heading along a curve defined on a plane or curved surface. When applied to map navigations on spherical surfaces (e.g., the Earth), and with navigation following curved paths, the architecture enables selection of a fixed heading based on the direction in which the camera is pointing, and then lay out all labels so that each label's "up" is pointed along this heading. In other words, after identifying an initial fixed camera heading for a scene on the surface, movement of the camera (e.g., zoom-in, zoom-out, position change, etc.) for the scene is along that heading without changing the camera heading as measured relative to a fixed point.

In a mapping implementation, after identifying an initial fixed camera heading along a curve over terrain of the Earth, movement of the camera (e.g., zoom-in, zoom-out, position change, etc.) in the scene is along that curve without changing the camera heading as measured relative to the fixed point.

Labels are oriented to a fixed heading for a scene. More specifically, the "up" orientation of a label is aligned based on the heading of the camera. Additionally, the architecture minimizes label motion relative to the underlying scene (e.g., map terrain) when the user interacts with the scene (e.g., a map, globe, etc.), labels, etc.

The architecture uses a fixed heading to maintain the orientation of a set of labels in the scene. The heading can be picked in many different ways; however, in one implementation, the heading is selected to match the camera heading. All labels are then configured to be presented such that their associated "upright" orientation matches this selected heading. Thus, any navigation that maintains the chosen heading (e.g., the camera heading) will not affect the orientation of the labels. For example, a panning navigation that follows loxodromes—lines of constant heading—and therefore does not change the heading, and does not cause label re-orientations.

While many users will typically desire English text labels to be presented as previously described, it is also within contemplation of the disclosed architecture that for users utilizing other languages that may normally be written and read in different orientations (e.g., written/read right-to-left, top-down, top-down and right-to-left, etc.), the disclosed architecture can also accommodate and preserve these orientations along the heading. For example, an East Asian user can be presented with labels as aligned along the heading in a vertical fashion or a horizontal fashion, based on the particular East Asian user since writing may be in a top-down fashion and reading a right-to-left direction; however, this is no longer a true in all instances.

In all cases, the camera view (heading) showing text labels centered in the view will have the text labels aligned on the heading that will be perceived as substantially aligned horizontal or vertical based on the language (for text), graphic, etc. Text labels that are presented farther away from the view center but along the heading may be oriented slightly differently since the heading is a curved heading relative to the scene; thus, English text labels near the bottom of the view will appear to be slanted downward (or inward) to the user in a left-to-right fashion, and English text labels to near the top of the view will appear to be slanted downward (inward) to the user in a right-to-left fashion. However, as the user traverses upward along the heading, the label orientation is "corrected" in the view center to a more horizontal orientation for English text, for example.

While panning a map, for example, the user's camera heading is not changed. Since camera heading is not changed during zooms or tilts, the movement that changes heading is an explicit change in heading such as turning the camera.

The readability is maintained in the entire scene but oriented optimally at or near the view center. Additionally, during most navigation (everything but an explicit heading change) the labels do not need to reorient, greatly reducing motion experienced by the viewer and maintaining a sense of orientation for the user. A "non-centered" label will not necessarily be "up" in screen space, but will nonetheless have the same heading as a label in the center. Additionally, when the scene (e.g., map) is panned to center the label, the label is oriented "up" in screen space without having moved the label relative to ground, for example.

The disclosed architecture further provides the capability of animating labels as desired, by joining 3D and 2D approaches of drawing labels such as text. This is accomplished by displaying the label (text) as a 3D object in the 3D scene when the view is stationary and first moving; thereafter, animating the text to a more optimal location and orientation (e.g., periodically) or when the view has stopped moving. This obtains the benefit of the label feeling stationary for a duration of time, while also ensuring the label is perceivable (e.g., readable for the case of text). In one case, animation can be applied to text on the surface of a 3D map, and the view movement is caused by user interaction with the map.

Using a 3D scene and labels (e.g., text) to be displayed in the scene, the labels are placed in the 3D scene in an orientation that is readable. As the view moves around the 3D scene, the label is moved as any other 3D object in the scene. Once the view has settled (stopped moving) for some period of time, a new position is calculated for the label and the label is animated from its old position/orientation to its new position/orientation.

The architecture also enables preservation of label readability by way of label orientation in accordance with changes in angle of the camera. When applied to map navigations, the architecture enables selection of a tilt angle for each label based on label positions, the camera position, and the direction (heading) in which the camera is pointing, and then orient all the labels so that each label's "normal" is pointed back to the camera plane for optimum user viewing. In other words, after identifying the base angle of a label in a scene (where the base angle is defined by rotation of the label base in the terrestrial plane and relative to a vertical axis (e.g., y axis)), movement (rotation of the label along a horizontal axis—a tilt angle) of that label can be such that the label face (defined by a plane in parallel alignment with the readable side of the label) is oriented to be approximately perpendicular to the camera heading to preserve label readability.

In a mapping implementation, after selecting a tilt angle, the label can be rendered to be oriented in accordance with the change in angle of the camera only when the angle crosses certain thresholds. In this case, only a fixed number of discrete positions of the label may be configured for used rather than continuous positions.

Hysteresis can also be employed to minimize label motion when the user navigates back and forth between positions and angles of the camera that would otherwise trigger such motion. Additionally, the architecture minimizes label motion relative to the underlying scene when the user interacts with the scene, labels, etc.

The architecture uses the tilt angle for each label to maintain readability of labels in the scene. The angle can be selected in many different ways; however, in one implementation, the selected angle is the angle between the label-to-camera vector and the label normal (terrain). All labels are then processed to be presented such that the tilt angle of the label is never greater than certain threshold(s). Thus, any navigation that maintains the tilt angles below or above the threshold(s) will not affect the orientation of the labels. For example, a zoom navigation that only changes the camera's altitude or that has subtle changes in the camera's position, and therefore, does not change the tilt angles in a significant way, does not cause label re-orientation.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a heading component 102 configured to establish a camera heading 104 (a fixed heading) along a curved virtual path 106 relative to a scene 108. The scene 108 comprises one or more labels 110 (e.g., a first Label $110_1$, a second Label $110_2$, a third Label $110_3$, and a fourth Label $110_4$) associated with scene objects 112 (e.g., a first object $112_1$, a second object $112_2$, a third object $112_3$, and a fourth object $112_4$). An orientation component 114 is configured to orient the labels 110 in a view 116 of the scene 108 in an upright orientation relative to movement along the curved path 106.

The heading component 102 and the orientation component 114 can interface to a rendering component 118 (e.g., as part of a graphics adapter) to render the path 106, scene 108, labels 110 and objects 112. The fixed heading (the camera heading 104) can be a loxodrome of a spherical body (e.g., a planet) on which the heading is relative. The fixed heading can be selected based on a direction that a virtual camera is pointing. The labels 110 can be are continuously oriented in the near upright or upright position as navigation progresses along the virtual path 106. The scene is of a geographical map on which the labels define geographical points of interest. The labels 110 move in unison as any other 3D object of the scene as the view 116 changes to match the heading. The rendering component 118 can be configured to render the labels 110 as a three-dimensional (3D) objects in a 3D scene (e.g., scene 108) when the view 116 is stationary or associated with an initial movement of the view 116.

Figure 2:
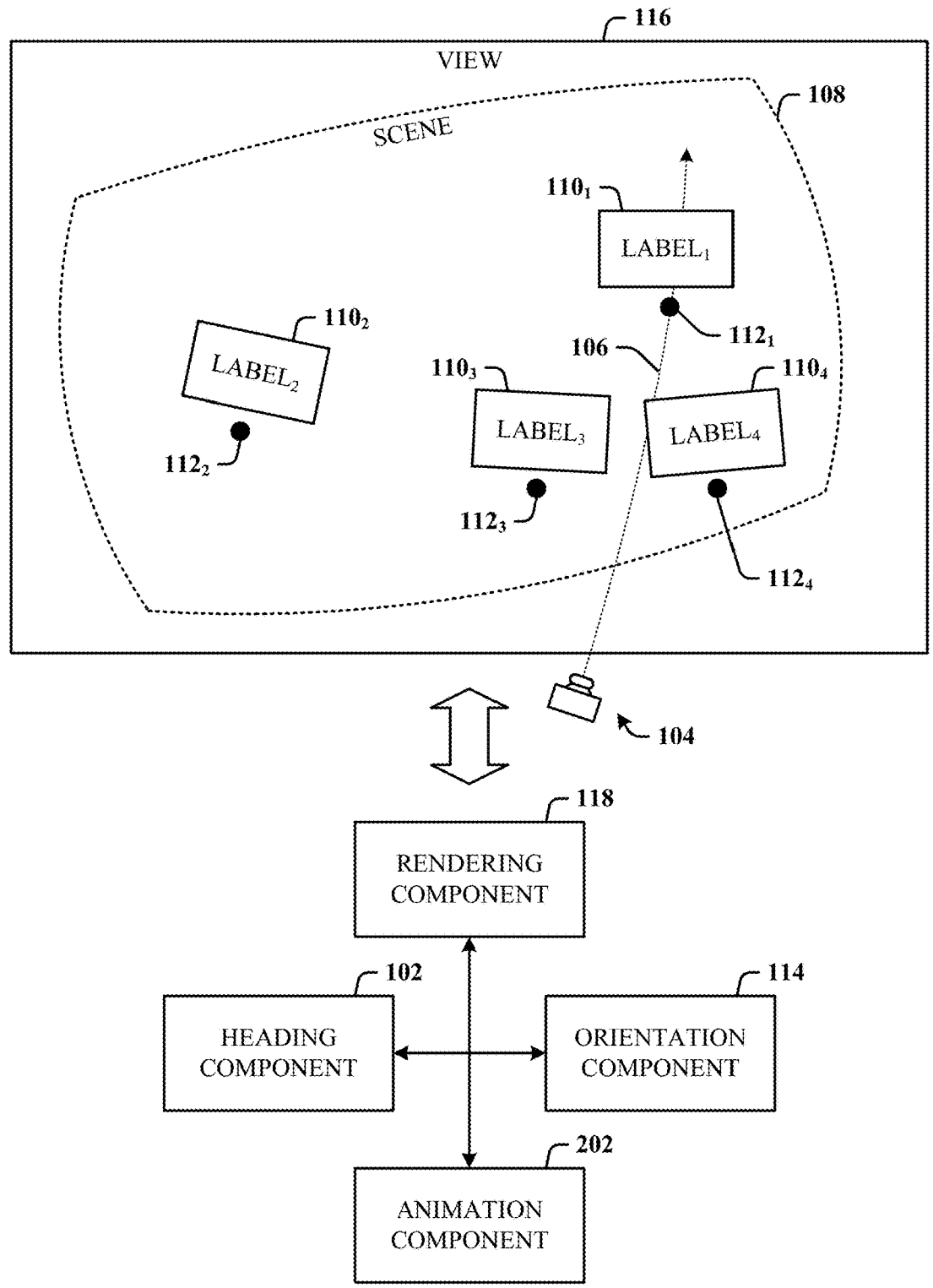
FIG. 2 illustrates a system that further comprises an animation component that animates the label(s) to a more optimal orientation based on camera movement along the curved path.

FIG. 2 illustrates a system 200 that further comprises an animation component 202 that animates the label(s) 110 (e.g., text, graphics, icons, etc.) to a more optimal orientation based on camera movement along the curved path 106. For example, the animation component 202 can be configured to animate the labels 110 to an optimal location periodically or when the view 116 has stopped moving (e.g., changing or moving over the map geography). The system 200 joins the 2D and 3D approaches of drawing text, for example. This is accomplished by displaying the text (or labels 110) as a 3D object in the 3D scene when the view 116 is stationary and first moving. Thereafter, the text is animated by the animation component 202 to a more optimal location (and orientation) periodically or when the view has stopped moving. The optimal location can be moving the name of a city from the right side of the map marker (e.g., dot, icon, graphic) to the left side, underneath, or above the map maker. This obtains both the benefit of the text feeling stationary for some duration of time, while also ensuring the text (label) is oriented for readability.

In one embodiment for mapping, the animation is applied to text (label) on the surface of a 3D map, and the view movement is caused by user interaction with the map. This approach handles labels in a new way. The label (e.g., text) and the 3D scene are displayed in the scene. This is facilitated by a 3D scene and text to be displayed in the 3D scene. The label (e.g., text) is oriented in the scene in a way that is readable. As the view 116 moves around the 3D scene 108, the text moves as any other 3D object in the scene 108. Once the view 116 has settled for some period of time, a new position is calculated for the Label (e.g., text) and the label is animated from its old position to a new position.

It is to be understood that in the disclosed architecture, certain components may be rearranged, combined, omitted, and additional components may be included. Additionally, in some embodiments, all or some of the components are present on the client, while in other embodiments some components may reside on a server or are provided by a local or remove service ("in the cloud").

Figure 3A:
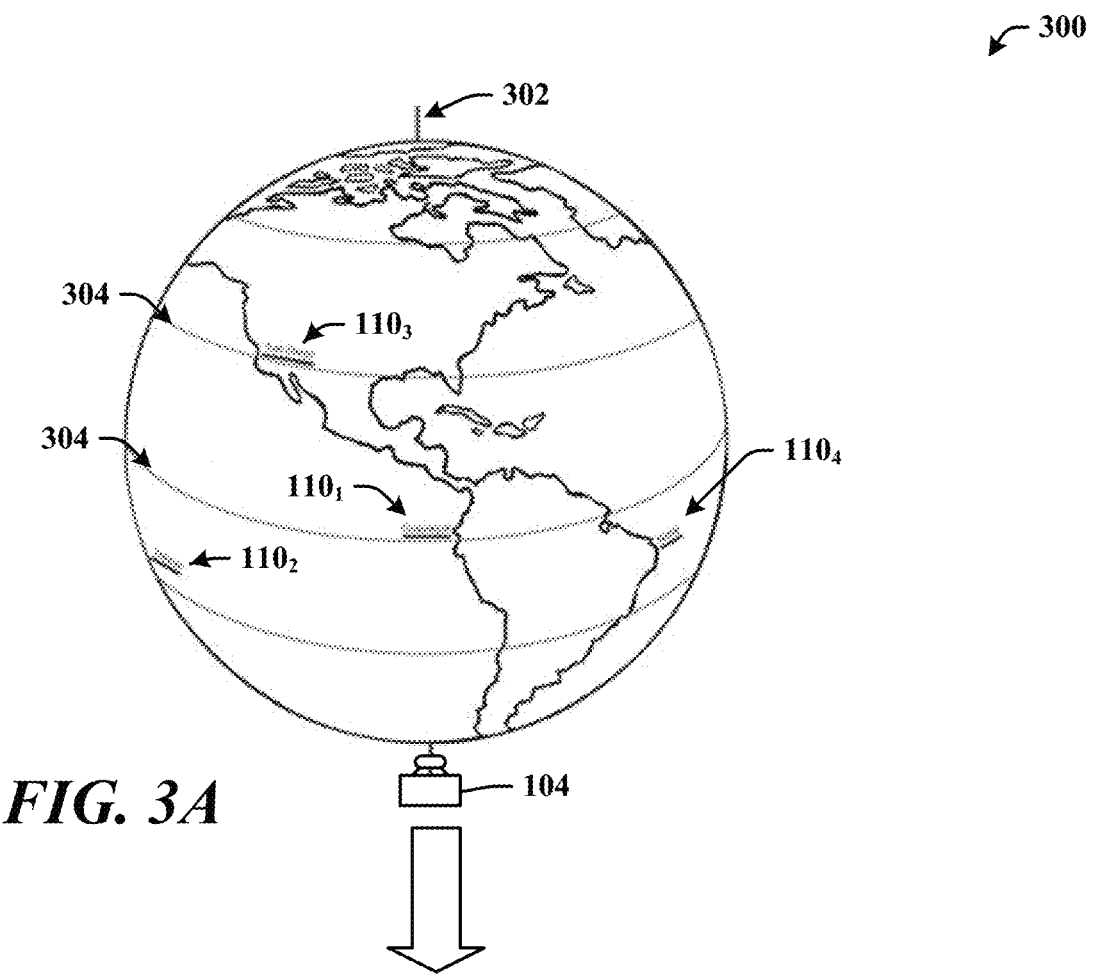
FIGS. 3A-D illustrate depictions of vector alignment relative to loxodrome lines of the Earth as the view changes.
Figure 3B:
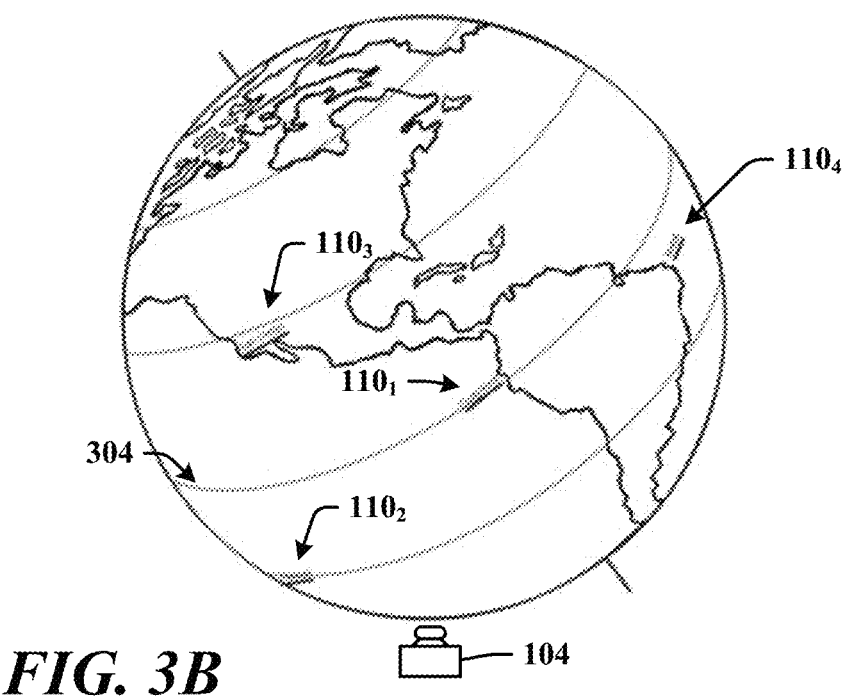
Figure 3C:
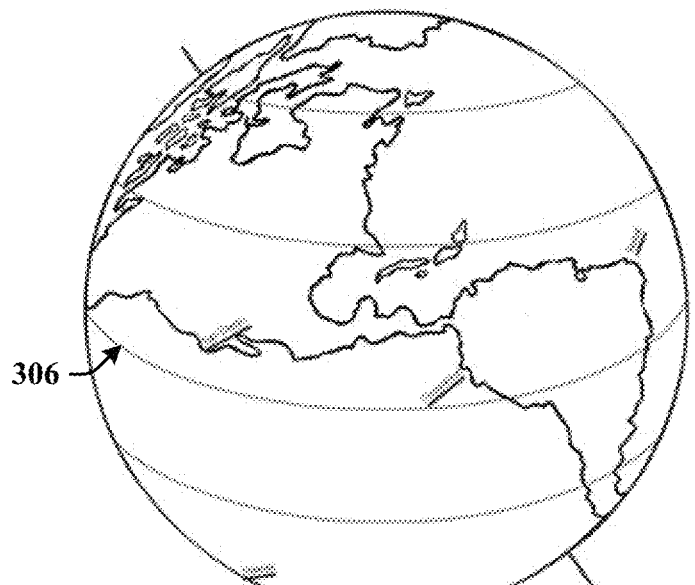
Figure 3D:
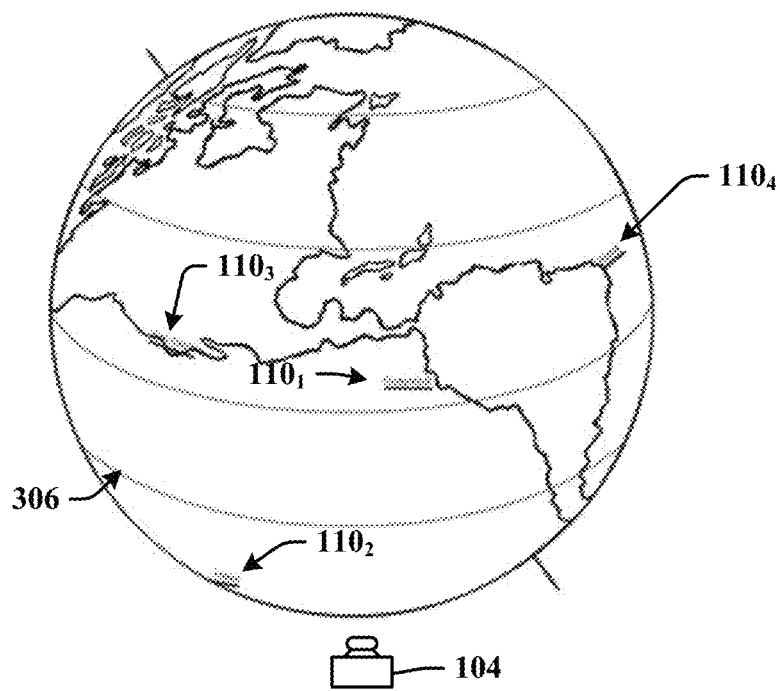

FIGS. 3A-D illustrate depictions 300 of vector alignment relative to loxodrome lines of the Earth as the view changes. In FIG. 3A, when the camera 104 is oriented "up", which is aligned with the Earth's North 302, the labels ($110_1$, $110_2$, $110_3$, and $110_4$) align with the loxodromes 304. In FIG. 3B, the view is rotated (e.g., approximately forty-five degrees counterclockwise) relative to the camera "up" orientation. Thus, the labels ($110_1$, $110_2$, $110_3$, and $110_4$) are now misaligned with the user's view, since the labels ($110_1$, $110_2$, $110_3$, and $110_4$) remain aligned with the loxodromes 304. In FIG. 3C, new "virtual" setting, loxodromes 306 are generated based on the "up" orientation of the camera 104. In FIG. 3D, the labels ($110_1$, $110_2$, $110_3$, and $110_4$) are then realigned to the new loxodromes 306.

Figure 4:
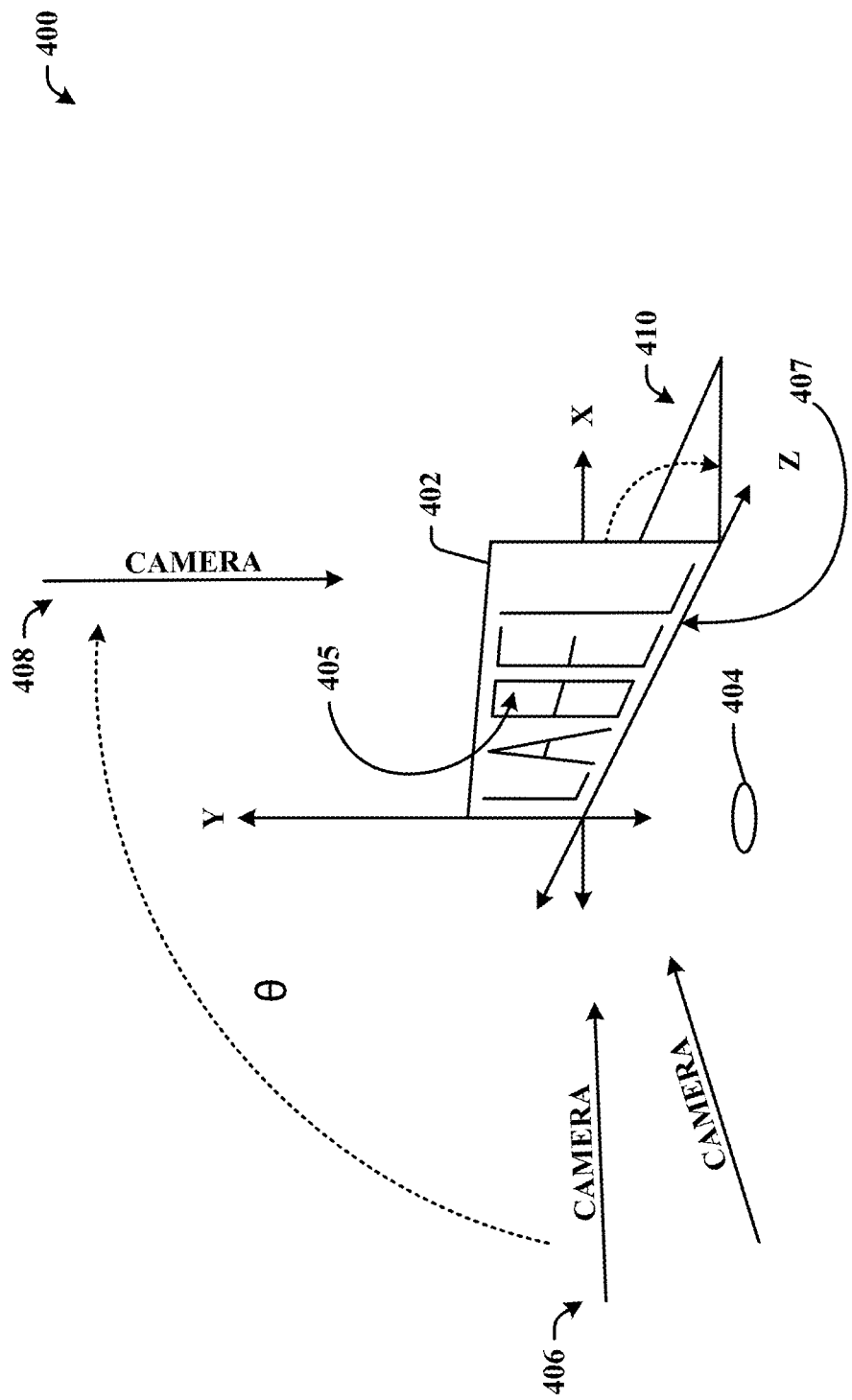
FIG. 4 illustrates examples of different orientations of a label that can be employed to ensure label readability and sense of orientation for a user viewing a scene.

FIG. 4 illustrates examples of different orientations 400 of a label 402 that can be employed to ensure label readability and sense of orientation for a user viewing a scene. The orientations 400 of the label 402 are shown relative to a 3D axis, as applied to the label 402 associated with a terrestrial-based location 404.

In an initial state (for purposes of description), a camera heading 406 is shown by the arrow pointing in the direction of (substantially orthogonal to) the face 405 (readable surface) of the label 402 and parallel to the terrain (e.g., surface of the Earth) on which the location 404 resides) the label 402. The base 407 of the label 402 lies in the plane of the terrain. The camera heading 406 is approximately at ground level, parallel to the terrain (zero degrees elevation) and heading to the label 402.

As the camera elevation increases from zero degrees elevation over an angle theta ($\theta$), the heading can remain the same, but the camera angle follows the angle $\theta$ such that the label 402 is rendered to be oriented (tilted backward) in accordance with the change in angle of the camera, to facilitate a more readable rendering of the label 402. Thus, if the camera angle is at forty-five degrees off the terrain pointing downward, the label 402 is rendered to appear as tilted backward approximately forty-five degrees to present a readable rendering of the label 402 at that camera angle. Ultimately, in a directly overhead camera position 408 (e.g., a satellite or aerial view), the camera angle is directly overhead at a ninety-degree downward pointing angle, as represented to the user with the label 402 tilted entirely backward about the Z axis to a position 410 (flat on the terrain), the label 402 facing upward so as to appear readable and providing a sense of orientation to the user.

In one implementation, the label 402 can be rendered to be oriented in accordance with the change in angle of the camera, in a continuous manner, rather than a segmented (or stepping) manner. For example, if the camera increases the angle to forty-five degrees (camera elevation increases to a suitable altitude where the downward-pointing angle relative to the location 404 on the surface) the label is tilted until is rendered approximately at forty-five degrees to maintain an approximate perpendicular orientation to the camera view and suitable readability for the viewer.

In alternative mapping implementations, the label 402 can be rendered using a fixed set of positions (e.g., stepped) as described herein. For example, in more simplified implementation, the architecture provides only two positions, standing upright or laying down substantially flat on the surface of the terrain, to minimize the label motion relative to the underlying scene. In this instance, the animation between the two positions can also be delayed until the camera idles (is motionless) to further minimize motion relative to the underlying scene. The two-position animation with delay implementation minimizes unnecessary motion as the position and angle of the camera changes back and forth at or near threshold boundaries.

Although shown here as the label 402 being edge-aligned with the Y axis, it can be the case that the label 402 is center-aligned such that the X and Y axes. In any case, the Z-axis can represent a line of latitude (e.g., a line of latitude 304 of FIG. 3A and a loxodrome 306 of FIG. 3D). Any labels in the scene away from the camera heading ("off-heading" labels), are rendered as slightly rotated inward toward the camera (or user) to provide label readability and sense of orientation to the user. This applies at any camera elevation; at zero elevation (a terrestrial view of camera heading 406), the off-heading labels are each rotated inward toward the camera and about the Y axis to appear as approximately perpendicular to the user. At the ninety-degree elevation (camera position 408), the off-heading labels are rendered as lying flat on the terrain and rotated slightly inward about the Y axis.

The label 402 can be rendered as rotated in various degrees about the Y axis, and rendered as rotated in various degrees about the Z axis to represent camera angle at various elevations. As indicated herein, the label 402 can be shifted along any axis (or vector thereof) to provide a more visible view of the location 404.

Figure 5:
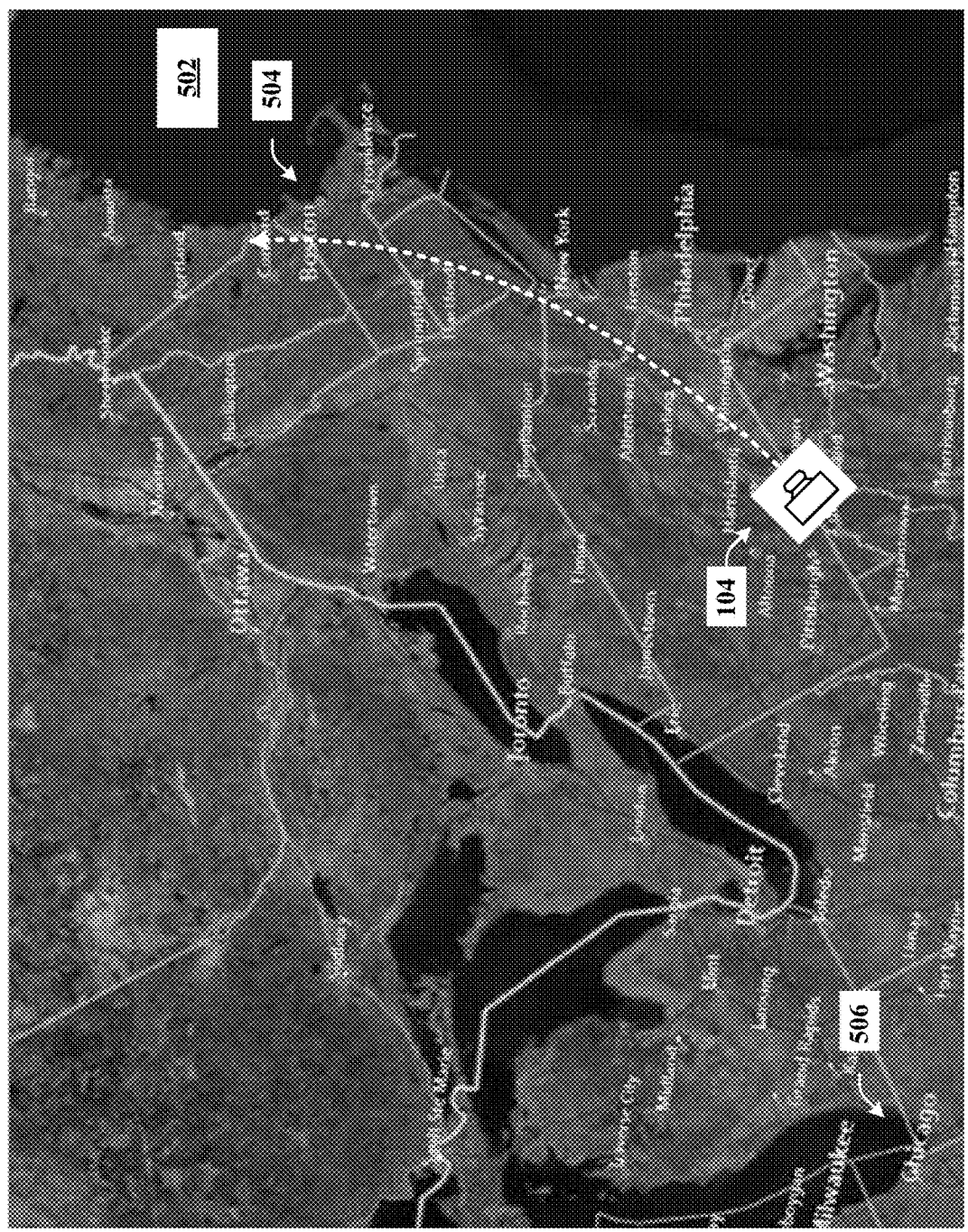
FIG. 5 illustrates a view where a scene where Boston is approximately center in the view and the camera heading is approximately forty-five degrees.

This orientation rendering applies to all labels in the scene. Moreover, as the rendering applies to labels away from the camera heading 406, rendering rotates these off-heading labels computes a slight FIG. 5 illustrates a view 500 where a scene 502 (e.g., image) where Boston is approximately center in the view 500, and the camera heading 104 is approximately forty-five degrees (and may be elevated for an aerial shot, for example). A "Boston" label 504 is oriented so that the "up" associated with the label 504 is at forty-five degree heading, as is every other label in the scene 502. In particular, note the position and orientation of the "Chicago" label 506, which is oriented with the same heading, but is no longer "up" in screen space, but slanted downward (inward) to match the slope of the path at that object. Note that the camera associated with the camera heading 104 is intended to depict where the image of the scene 502 is taken from (the perspective), and therefore, does not actually lie in the scene. For example, in a real-world example, the camera can be somewhere in space above the Boston area (the camera footprint would be over Boston or slightly south of Boston).

Figure 6:
FIG. 6 illustrates a panned view so that the "Chicago" label is now substantially centered.

FIG. 6 illustrates a panned view 600 so that the "Chicago" label 506 is now substantially centered. Accordingly, the "Chicago" label 506 is now oriented "up" (or in a user readable or approximately user readable orientation) in screen space, but has not moved relative to scene background (e.g., the ground). (It should be noted that some parallax differences may exist due to altitude elevation of the label.) The centering process comprises the periodic animation to re-orient the labels, text, objects as desired, or to continuously perform the orientation as movement of the scene occurs.

Figure 7:
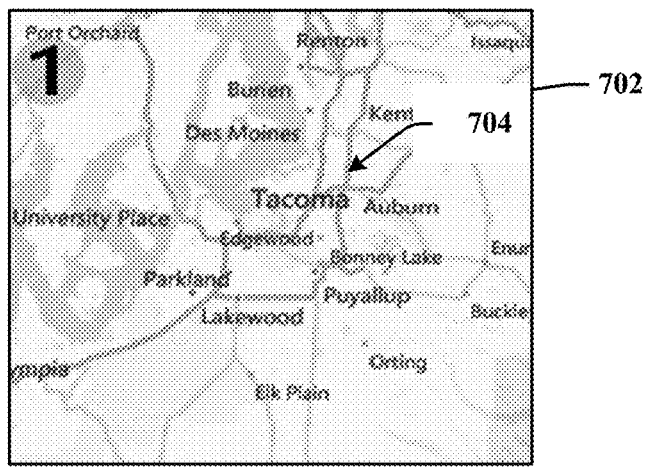
FIG. 7 illustrates a set of panels that depict animation of labels after an amount of time.
Figure 7:
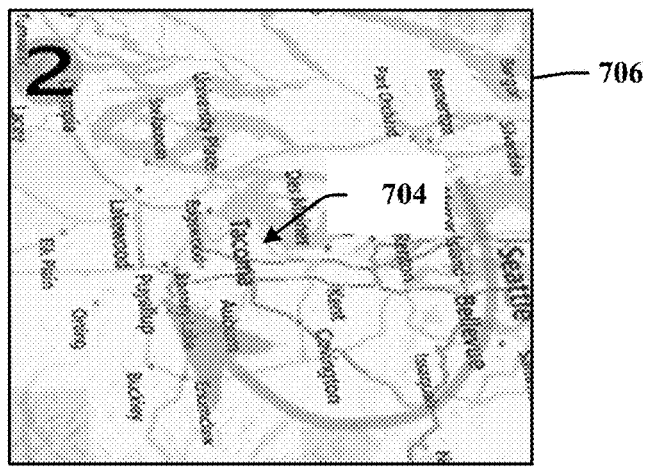
Figure 7:
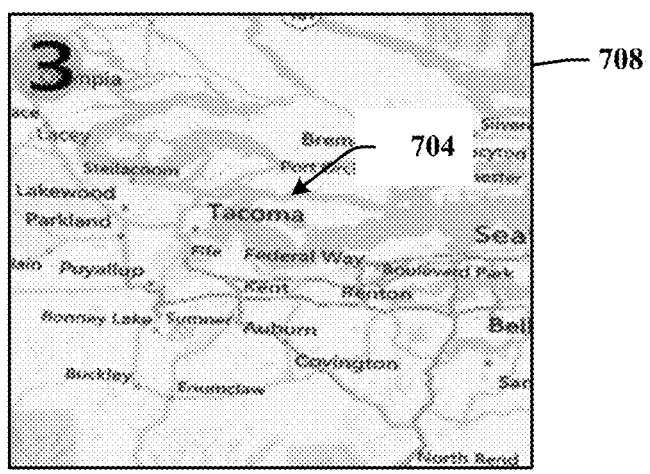

FIG. 7 illustrates a set of panels 700 that depict animation of labels after an amount of time. In a first panel 702, a view is of a 3D space of a height map of the Tacoma, Wash. area. Note that the "Tacoma" label 704 is fixed to (lying on) the ground. In a second panel 706, the view now rotates and tilts, and the "Tacoma" label 704 rotates with the ground, maintaining the sense that the label 704 is part of the 3D scene. In a third panel 708, when the view has been stable for some period (duration) of time, the "Tacoma" label 704 is re-oriented back into a readable orientation. The animation for all labels can be a quick snap motion, for example, that re-orients all labels in a single move, or another type of motion that is more perceptible by the user, such as an incremental (e.g., three step) rotation. Other graphical emphasis can be applied as well, such as highlighting, audio supplementation for specific labels, etc.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
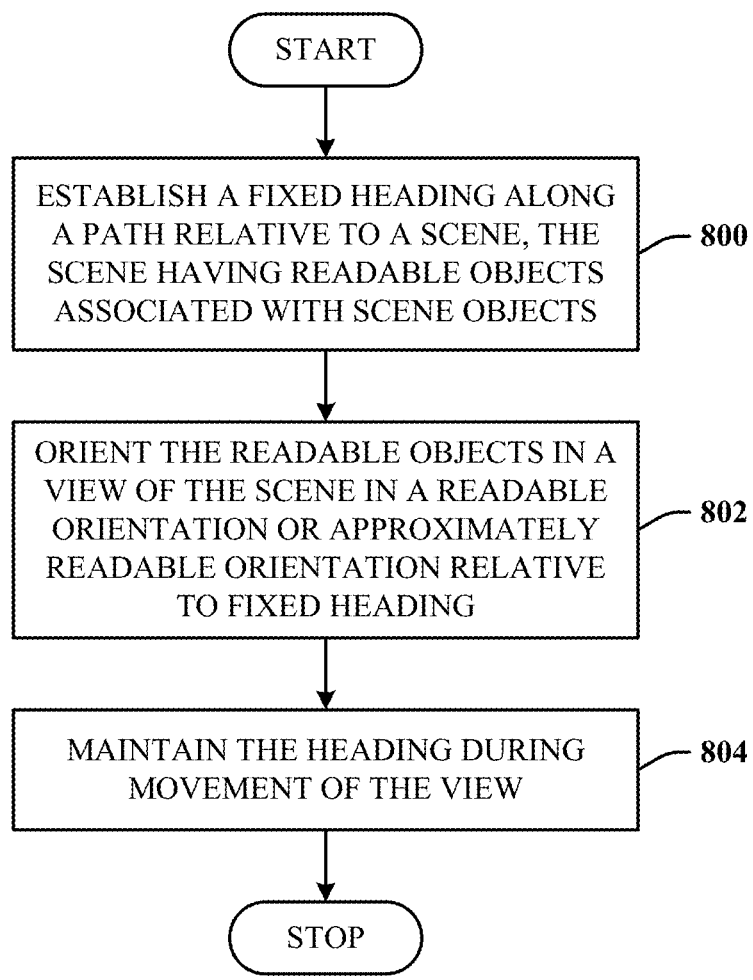
FIG. 8 illustrates a method in accordance with the disclosed architecture.

FIG. 8 illustrates a method in accordance with the disclosed architecture. At 800, a fixed heading is established along a path relative to a scene, the scene having readable objects associated with scene objects. At 802, the readable objects are oriented in a view of the scene in a readable orientation or approximately readable orientation relative to the fixed heading. At 804, the heading is maintained during movement of the view.

The method can further comprise selecting the heading based on a direction in which a virtual camera is pointing. The method can further comprise orienting the objects continuously or periodically in the readable orientation or approximately readable orientation as the view changes.

The method can further comprise rendering the objects as a three-dimensional (3D) objects in a 3D scene when the view is stationary or associated with an initial movement of the view. The method can further comprise animating the objects to an optimal location periodically or when the view has stopped moving. The method can further comprise animating the objects in unison to an optimal readable orientation periodically or when the view has stopped moving.

Figure 9:
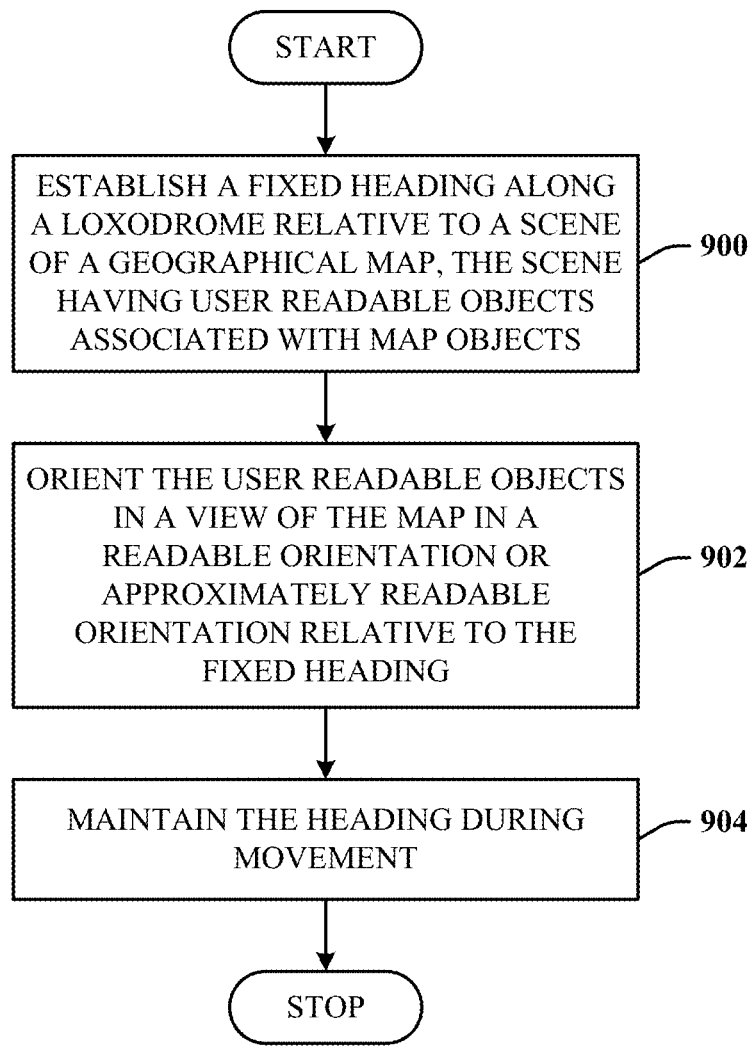
FIG. 9 illustrates an alternative method in accordance with the disclosed architecture.

FIG. 9 illustrates an alternative method in accordance with the disclosed architecture. The methods herein can be embodied on a computer-readable storage medium comprising computer-executable instructions that when executed by a microprocessor, cause the microprocessor to perform the acts of the methods.

At 900, a fixed heading can be established along a loxodrome relative to a scene of a geographical map, the scene having user readable objects associated with map objects. At 902, the user readable objects in a view of the map are oriented in a readable orientation or approximately readable orientation relative to the fixed heading. At 904, the heading is maintained during movement.

The acts of the method can further comprise selecting the heading based on a direction in which a virtual camera is pointing. The acts of the method can further comprise orienting the objects continuously or periodically in the readable orientation or approximately readable orientation as the view changes. The acts of the method can further comprise rendering the objects as a three-dimensional (3D) objects in a 3D scene when the view is stationary or associated with an initial movement of the view.

The acts of the method can further comprise animating the objects to an optimal location periodically or when the view has stopped moving. The acts of the method can further comprise animating the objects in unison to an optimal readable orientation periodically or when the view has stopped moving.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
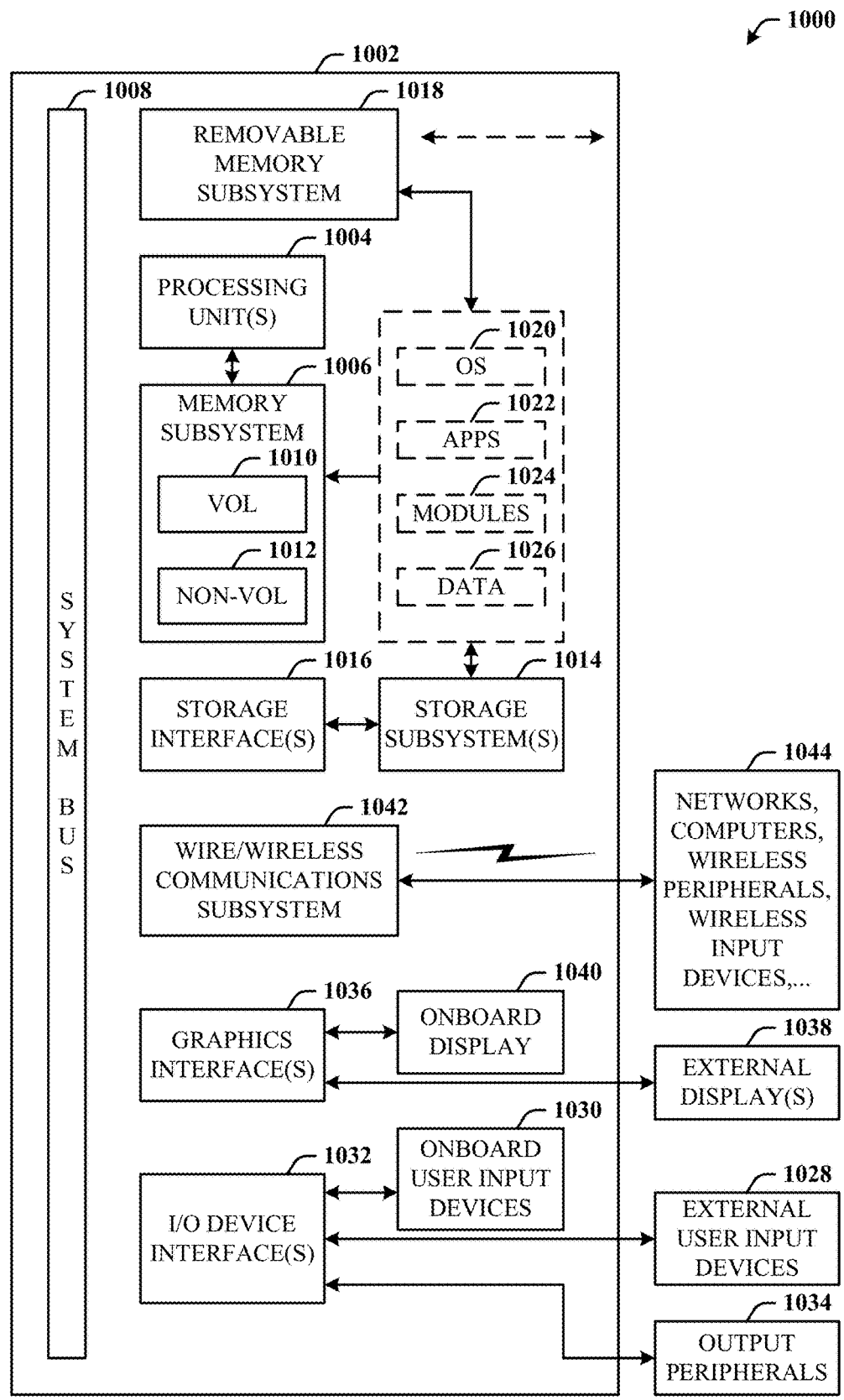
FIG. 10 illustrates illustrated a block diagram of a computing system that executes user heading tracking and delayed re-orientation of labels in accordance with the disclosed architecture.

Referring now to FIG. 10, there is illustrated a block diagram of a computing system 1000 that executes user heading tracking and delayed re-orientation of labels in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having microprocessing unit(s) 1004 (also referred to as microprocessor(s) and processor(s)), a computer-readable storage medium such as a system memory 1006 (computer readable storage medium/media also include magnetic disks, optical disks, solid state drives, external memory systems, and flash memory drives), and a system bus 1008. The microprocessing unit(s) 1004 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1002 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1006 can include computer-readable storage (physical storage) medium such as a volatile (VOL) memory 1010 (e.g., random access memory (RAM)) and a non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the microprocessing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components and circuits. The storage subsystem(s) 1014 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

Generally, programs include routines, methods, data structures, other software components, etc., that perform particular tasks, functions, or implement particular abstract data types. All or portions of the operating system 1020, applications 1022, modules 1024, and/or data 1026 can also be cached in memory such as the volatile memory 1010 and/or non-volatile memory, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1002, and include volatile and non-volatile internal and/or external media that is removable and/or non-removable. For the computer 1002, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1002, programs, and data using external user input devices 1028 such as a keyboard and a mouse, as well as by voice commands facilitated by speech recognition. Other external user input devices 1028 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 1002, programs, and data using onboard user input devices 1030 such a touchpad, microphone, keyboard, etc., where the computer 1002 is a portable computer, for example.

These and other input devices are connected to the microprocessing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The operating system 1020, one or more application programs 1022, other program modules 1024, program data 1026 and/or graphic interface(s) 1036 can include entities and components of the system 100 of FIG. 1, entities and components of the system 200 of FIG. 2, the depictions and capabilities associated with FIG. 3, orientations depicted in and associated with FIG. 4, components and capabilities depicted in and associated with FIG. 5, components and capabilities depicted in and associated with FIG. 6, components and capabilities depicted in and associated with the panels 700 of FIG. 7, and the method represented by flowcharts of FIGS. 8 and 9, for example.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   a memory coupled to the at least one processor and storing instructions that, when executed by the at least one processor, perform operations, comprising:
   determining, based at least in part, on a viewing angle and an elevation of a virtual camera in a virtual map, an orientation of a label, the orientation causing the label to be perpendicular to the viewing angle and the viewing elevation of the virtual camera, the label being associated with a scene object;
   receiving input that changes at least one of the viewing angle and the viewing elevation of the virtual camera; and automatically updating the orientation of the label in response to the received input such that the label remains perpendicular to the viewing angle and the viewing elevation of the virtual camera.

2. The system of claim 1, further comprising instructions for maintaining the orientation of the label as navigation progresses along a virtual path.

3. The system of claim 1, wherein the virtual map is a geographical map on which the label defines a geographical point of interest.

4. The system of claim 1, further comprising instructions for periodically animating the label.

5. The system of claim 1, wherein the orientation comprises a tilt angle.

6. The system of claim 1, further comprising instructions for causing the label to rotate about an axis in response to received input.

7. The system of claim 1, wherein the label is periodically animated.

8. A method, comprising:
   determining an orientation of user readable objects associated with scene objects displayed on a map, the orientation being based, at least in part, on a viewing angle and a viewing elevation of a virtual camera and causing the user-readable objects to be perpendicular to the viewing angle and the viewing elevation of the virtual camera;
   receiving input that alters at least one of the viewing angle and the viewing elevation of the virtual camera; and
   in response to the input, automatically orienting the user readable objects such that the user readable objects remain perpendicular to the viewing angle and the viewing elevation of the virtual camera.

9. The method of claim 8, further comprising determining a heading based, at least in part, on a direction in which the virtual camera is pointing.

10. The method of claim 8, wherein automatically orienting the user readable objects comprises continuously orienting the user readable objects as the viewing angle and the viewing elevation of the virtual camera changes.

11. The method of claim 8, wherein the scene objects are rendered as a three-dimensional (3D) objects.

12. The method of claim 8, further comprising animating the user-readable objects as the user-readable objects are automatically oriented.

13. The method of claim 8, further comprising causing the user readable objects to rotate about an axis in response to the received input.

14. A method, comprising:
   displaying a label on a virtual map in a perpendicular orientation relative to a viewing angle and a viewing elevation of the virtual camera, the label being associated with an object in the virtual map;
   receiving input that changes at least one of the viewing angle and the viewing elevation of the virtual camera; and
   automatically and continuously updating the perpendicular orientation of the label in response to the received input such that the label remains in the perpendicular orientation with respect to the viewing angle and the viewing elevation of the virtual camera.

15. The method of claim 14, further comprising providing an animation to the label as the perpendicular orientation is updated.

16. The method of claim 14, wherein the virtual map is rendered as a three-dimensional map.

17. The method of claim 14, further comprising animating text associated with the label.

18. The method of claim 14, wherein the label is periodically animated.

19. The method of claim 14, wherein the received input is touch input.

20. The method of claim 14, wherein the input causes the label to rotate about an axis.

* * * * *